United States Patent [19]

Bereiter

[11] Patent Number: 4,789,499
[45] Date of Patent: Dec. 6, 1988

[54] PROCESS AND APPARATUS FOR SAPONIFICATION REACTIONS

[75] Inventor: Bruce A. Bereiter, Corona, Calif.

[73] Assignee: Henkel Corporation, Ambler, Pa.

[21] Appl. No.: 2,822

[22] Filed: Jan. 22, 1987

Related U.S. Application Data

[63] Continuation-in-part of Ser. No. 825,390, Feb. 3, 1986, Pat. No. 4,671,892.

[51] Int. Cl.$^4$ ............................ C11D 13/00; B01D 3/08
[52] U.S. Cl. .................................... 252/369; 252/370; 422/231; 422/234; 422/62; 436/55
[58] Field of Search ............... 422/230, 227, 231, 228, 422/234, 235; 436/62, 55; 366/136, 137; 252/368–370

[56] References Cited

U.S. PATENT DOCUMENTS

| | | | |
|---|---|---|---|
| 1,404,709 | 1/1922 | Allbright | 422/227 |
| 2,578,366 | 12/1951 | Mills | 252/134 |
| 2,823,187 | 2/1958 | Coyle | 252/114 |
| 3,522,017 | 7/1970 | Barfield, Jr. | 422/230 |

Primary Examiner—Michael S. Marcus
Attorney, Agent, or Firm—Ernest G. Szoke; Henry E. Millson, Jr.; Real J. Grandmaison

[57] ABSTRACT

Reaction equipment for chemical processes, e.g., saponification processes having reaction times of about 2–8 minutes. The reactants are measured, and fed sequentially into a reactor. The reactants are sequentially mixed and reacted by recycling, and at the end of the reaction the recycling is terminated and the finished product is pumped to storage. A microprocessor controller may be provided to sequence the feed and amount of reactants and the reaction times.

20 Claims, 3 Drawing Sheets

PROCESS AND APPARATUS FOR SAPONIFICATION REACTIONS

This application is a continuation-in-part application of Ser. No. 825,390, filed Feb. 3, 1986, in favor of Bruce A. Bereiter, now U.S. Pat. No. 4,671,892.

BACKGROUND OF THE INVENTION

1. Field of the Invention

This invention relates to a new and improved process and apparatus for saponification reactions and the like, e.g. to produce liquid soaps, on a batch scale over a sufficiently short time interval to effect a semicontinuous process. Typically, the reaction times are in the order of about 2–8 minutes, and reactor vessel capacities are of about 1–25 gallons, or greater.

2. Statement of Related Art

The chemical industry manufactures a wide variety of liquid soaps at plant sites in large quantities for shipping in container cars, drums, etc. The containers are then returned to the site and refilled. In the case of drums, they are usually washed prior to return, which creates a waste disposal problem. In addition, when shipping from a chemical manufacturing plant, the weight of water diluent in the liquid soap represents a transportation expense. Today, the manufacture of liquid soaps used in industry no longer poses a manufacturing problem from the chemical standpoint. The greater problem is posed in transportation of chemically toxic wastes, and in use of reactors which are economically effective in both large and small scale manufacture of the product.

Obviously, it would be far less expensive to ship raw materials to the site of use and manufacture the liquid soap at that particular site. This would enable the raw materials to be shipped in bulk, without water, and then be pumped out of, say, tanker cars, or large containers directly into a saponification reactor vessel.

DESCRIPTION OF THE INVENTION

Figure 1:
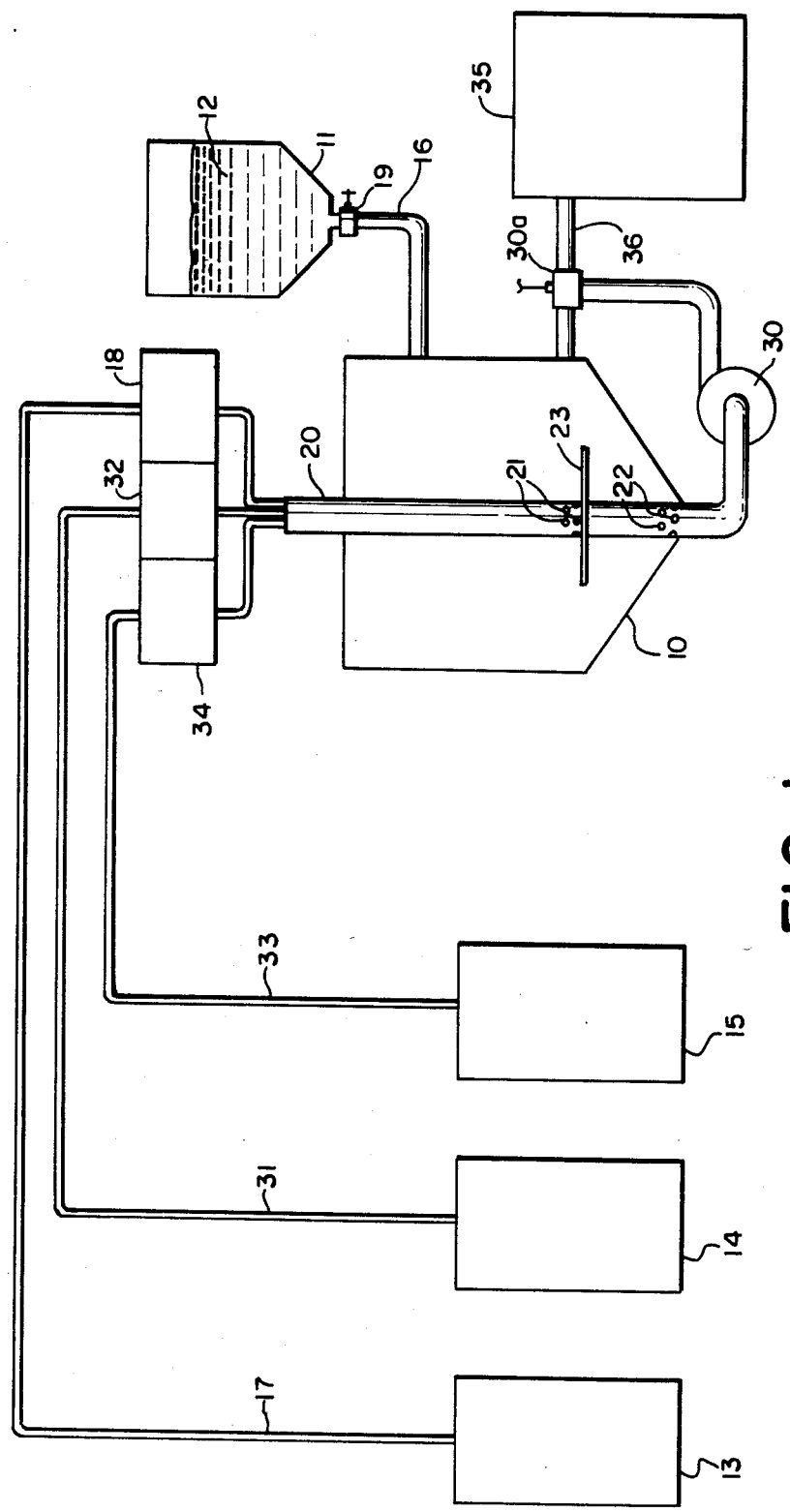
FIG. 1 is a schematic and block diagram view of one embodiment of apparatus suitable for use in the invention.

Heretofore, the capital costs of reactor vessels for saponification reactions in batch form were not economic in small sizes. However, if a batch chemical operation could be carried out in a reasonably continuous manner, or in a semi-continuous manner, the equipment capital costs could be reduced sufficiently to enable a user to manufacture liquid soaps on site. It would also be useful if the same reactor used for a chemical reaction could be used in the manufacture of similar ingredients formed simply by mixing, such as cleaning compounds, beverages, foods, etc. Thus, saponification reactions, esterification reactions, the manufacture of detergents, lubricant soaps, etc., are included in the term "saponification reactions and the like" when used herein.

According to the invention, a process and apparatus is provided for the batch manufacture on a semi-continuous basis for saponification reactions and the like. Basically, the reactions produce liquid products during a reaction time which varies from about 2–8 minutes. The ingredients are added sequentially in weighed amounts to water in the reactor, and the mixture of water and ingredients are recycled, usually continuously, to ensure adequate mixing during a predetermined reaction time set for each ingredient.

At the expiry of the total ingredient reaction time, the recycling operation is stopped and the liquid reactant product is fed to storage; the process is then repeated. Since the process is carried out a large number of times daily, it is preferred to employ a microprocessor to control valve on-off times to enable sequencing of reactant addition and reaction times. This reduces the possibility of operator errors and also ensures product uniformity. Various techniques may be used to obtain an accurate feed of reactants and include the use of a load cell, pump rates (rpm), timed volume feed, etc. it is to be understood, however, that the equipment can also be controlled manually, using suitable valves and pumps well known to the art.

The microprocessor, which is the preferred method of controlling the equipment, can be readily selected from commercially available units by those skilled in this art. For example, using an STD bus, a main processor board, an STD bus card to control inputs and outputs for the valves, pumps, and switches used with the equipment, and another STD bus card to read the load cell used with one embodiment of the equipment, are commercially readily available, e.g. from Prolog, Inc., or Computer Dynamics Company. The operating program, which is stored on the main processor board, can readily be prepared by one skilled in this art to operate the equipment for any process to be run in accordance with the teachings of the present invention.

Typical raw materials for saponification reactions include: tall oil, coconut oil, oleic acid, linoleic acid, saponifiable oils containing liquid oleic and linoleic acid, and cracked oils. Other base chemicals include fatty acids such as butyric, caproic, caprylic, undecanoic, capric, nonanoic, lauric, myristic, palmitic, stearic, elaidic, and mixtures thereof. Alkalis suitable for the saponification reaction include NaOH, KOH, and the mono, di, and triethanolamines.

Reaction temperatures usually vary from about 120° F.–140° F., however, the maximum temperature limits vary from about 70° F. to about 200° F. These temperatures are achieved partly by the use of hot water and partly by the exothermic nature of the reaction.

The usual concentrations of ingredients are about 5:1–6:1 of saponifiable raw material/caustic, where the saponification number varies from about 175–280. The amount of water used is at least 60% of the total weight of ingredients, and typically 75%–80% by weight of the ingredient concentration. Saponifiable oils, e.g., tall oil, may be employed as a 100% concentrated liquid, and the caustic is added as a 45%–50% solution.

Additives such as chelates, EDTA and detergents may be used to reduce the effect of hard water ions. Solvents such as isopropyl alcohol, glycol ether and butyl acetate are useful as solvents and viscosity thinners. Antimicrobial agents, bacteriostats, preservatives, essences, perfumes, etc., also may be used.

Reactor vessel sizes of about 1–25 gallons are suitable for most reactions, and the only practical upper limit on reactor size is that imposed by the economics of a large size plant. It will be appreciated that small size reactors of say 1–2 gallons are suitable for use in such diverse areas as dairies, laundries, restaurants, hotels, etc., where the raw material economics and process costs are counterbalanced by the cost of delivered liquid soap.

One embodiment of the apparatus of this invention is shown in FIG. 1, and comprises a cone-shaped reactor vessel 10 fed from a supply tank 11 containing water 12, and from reactor tanks 13, 14 and 15. Prior to commencement of the reaction, water is gravity fed and measured into the reactor through valve 19 and line 16, followed in sequence by the other reactants. The material to be reacted, e.g. tall oil, from tank 13 is then fed through line 17 by pump 18, to produce a measured, stoichiometric amount of reactant, and then fed through an inlet feed pipe 20 into the reactor vessel 10. The feed pipe 20 has two sets of spaced openings 21 and 22 and a baffle plate 23 between the two sets of openings to direct the flow of water and reactants toward the sidewall of the vessel for improved circulation and mixing. Each set of openings is preferably positioned around the circumference of the conduit, more preferably in substantially uniformly spaced relationship, and most preferably comprising two rows of uniformly spaced openings around the circumference of the conduit.

A recirculating pump 30 recirculates the mixture of water and the reactant from tank 13 from the bottom of the reactor vessel 10 and through a recirculation valve 30a to an intermediate level of reactor vessel 10, usually just (e.g. 2 inches) below the liquid level of reactor vessel 10, until adequate mixing has occurred. After a predetermined set period of mixing, a measured quantity of caustic such as KOH is fed from tank 14 through line 31 by pump 32, and pumped into the reactor vessel 10. Mixing by means of the recirculating pump 30 is continued. Finally, a measured quantity of other components such as EDTA, chelates, detergents, solvents, thinners, etc., in tank 15 (or additional tanks, if necessary) are pumped through line 33 by pump 34 to the reactor vessel 10. Mixing and reacting by means of recirculation pump 30 is continued.

After a preset fixed period of reaction time, the recirculation valve 30a is switched from the reactor vessel 10 to a storage tank 35 through line 36. The liquid soap or other product which has been formed in the reactor vessel is then pumped out of the reactor by pump 30 through line 36 and into storage tank 35, or other containers, etc., for use. Obviously, if desired, the heat of reaction which has been transferred from the reactor to the storage tank can be removed for use in the building.

Figure 2:
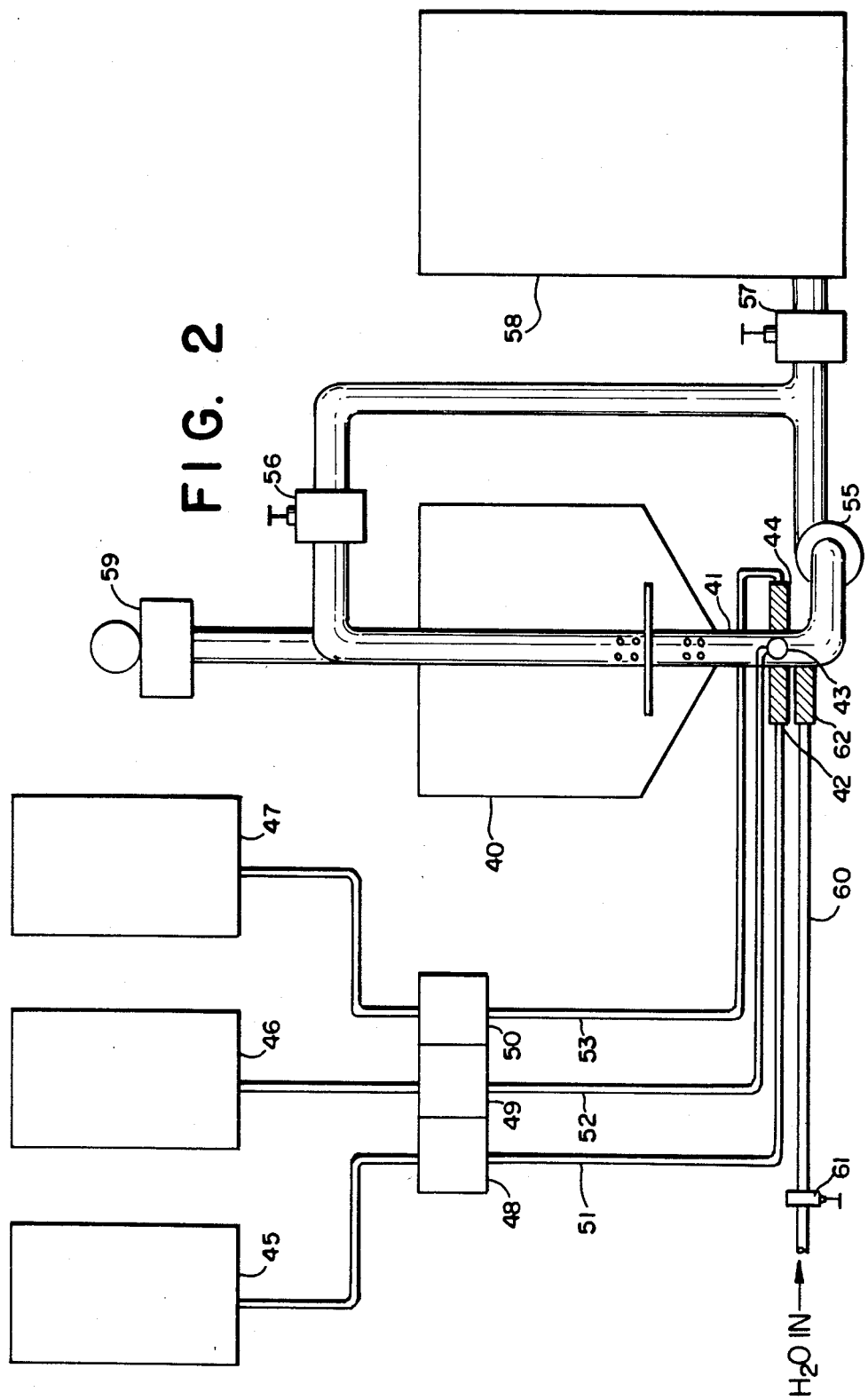
FIG. 2 is a schematic view of another embodiment of apparatus suitable for use in the invention.

In another and preferred embodiment of this invention, as shown in FIG. 2, all the ingredients are fed through separate inlets leading to a common conduit which is centrally located in the reactor vessel, as in FIG. 1. This common inlet feed provides a more intimate mixing, and hence a more efficient reaction of the ingredients.

Reactor vessel 40 is shown with conduit 41 having lower entry ports 42, 43 and 44, which lead from supply tanks 45, 46 and 47. Pumps 48, 49 and 50 sequentially pump the reactants from their respective supply tanks through lines 51, 52 and 53 to the lower entry ports 42, 43 and 44. Water is separately fed from a supply source (e.g., a water line) through inlet pipe 60 and solenoid water valve 61 through entry port 62 into pipe 41. The water acts as a diluent and helps control the temperature rise of the exothermic reactions.

Recirculating pump 55 recirculates and mixes ingredients from supply tanks 45, 46 and 47 through recirculating valve 56 into reactor vessel 40 through the top thereof, as opposed to the side entry shown in FIG. 1. At the end of the reaction period, recirculating valve 56 is shut and transfer valve 57 is opened. This enables the liquid soap or other product which has been produced to be diverted into storage tank 58. Load cell 59, from which reactor vessel 40 and conduit 41 are suspended, controls through a miroprocessor (not shown) the quantity of ingredients added at each stage of the process by differential weight measurement.

Figure 3:
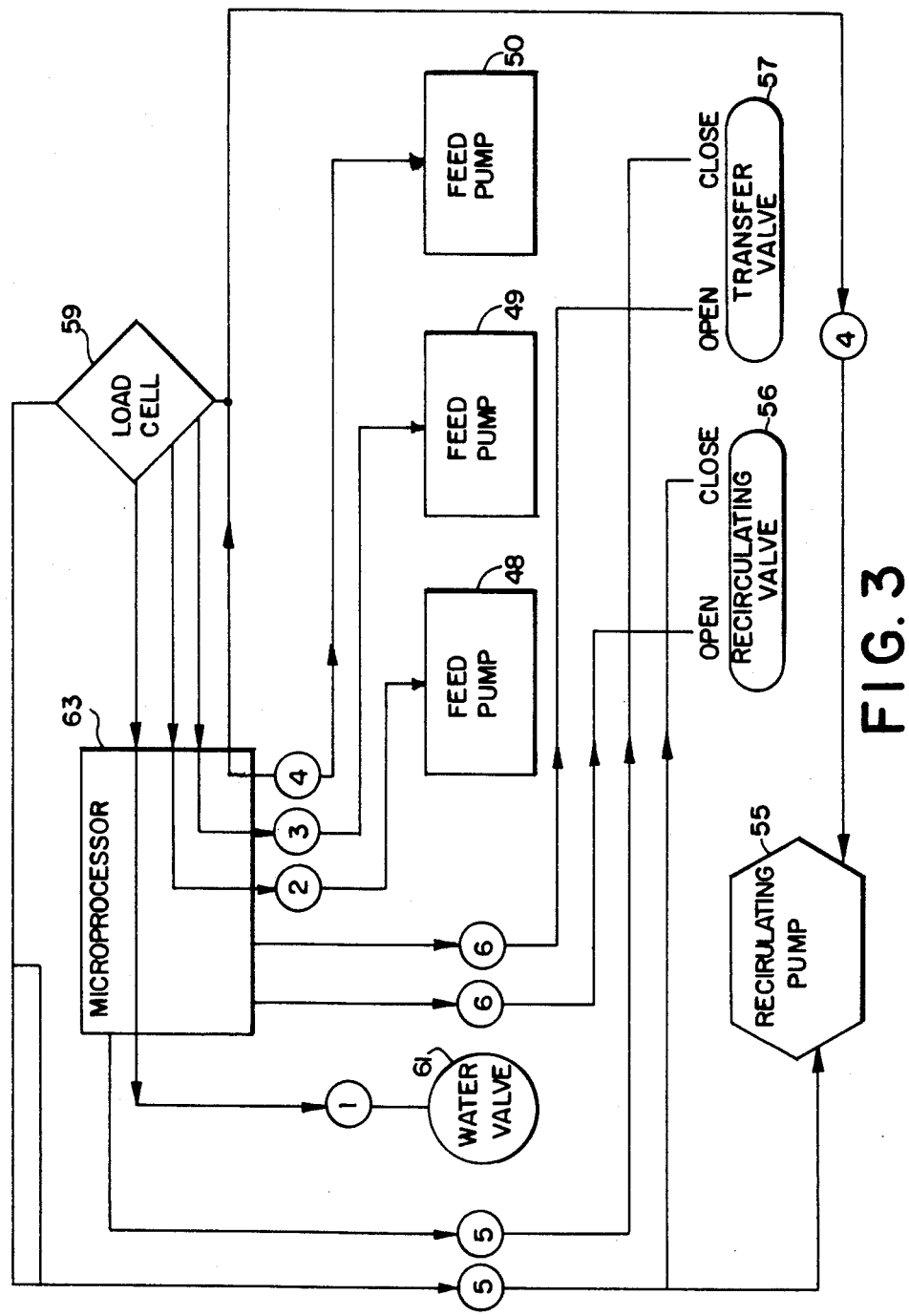
FIG. 3 is a schematic of the flow control system of the invention.

FIG. 3 shows a process flow chart for the sequencing of the ingredient flow for the embodiment shown in FIG. 2. The numerals set forth in FIG. 3 show the specific sequencing steps. In step 1, water flow is commenced by microprocessor 63 which opens solenoid water valve 61 and checks the set weight through load cell 59. When the set weight equals actual weight, solenoid water valve 61 is closed.

In step 2, ingredient 1 is fed into the reactor by microprocessor 63 which starts feed pump 48. Again the set weight of the ingredient is compared by microprocessor 63 with the actual reading from load cell 59. When the two weights are equal, feed pump 48 is turned off by microprocessor 63.

In steps 3 and 4, the remaining two ingredients are added, with the same weight checking being made, as in steps 1 and 2. In step 4, recirculating pump 55 is started by microprocessor 63 prior to the commencement of the weighing check by microprocessor 63. After a set period of recirculation (i.e., mixing), during which time the ingredients have reacted, recirculating pump 55 is stopped.

Step 5 involves a transfer cycle, and here recirculating valve 56 is closed, transfer valve 57 is opened, and recirculating pump 55 is started and runs until the load cell reads zero weight by comparison with the total input weight of all ingredients. Recirculating pump 55 is then stopped.

In step 6, recirculating valve 56 is opened and transfer valve 57 is closed to complete an entire single operation, which as indicated occurs during a 2-8 minute interval. The system then returns to step 1.

Obviously, many variations are possible for the process control. For example, recirculating pump 55 could be run continuously (at low speed) when mixing is not required to avoid frequent starts and stops and to reduce start up power requirements.

The invention will be illustrated but not limited by the following example.

EXAMPLE

The process of this example was carried out using the equipment shown in FIG. 2, and all reference numbers given in the example refer to FIG. 2.

137 lbs. of soft water (pretreated by a water softener) at a temperature of 120°-160° F. were added to conduit 41 and reactor vessel 40 through inlet pipe 60 and entry port 62. The water was weighed by local cell 59 and the opening and closing of solenoid water valve 61 was controlled by microprocessor 63 (FIG. 3).

Then 21.6 lbs. of the following premix was added from tank 47 by pump 50 through line 53 into entry port 44 into conduit 41 by means of microprocessor 63 and load cell 59.

| Premix Composition | |
|---|---|
| Ingredient | % by weight |
| Water | 24.53 |

-continued

| Premix Composition | |
|---|---|
| Ingredient | % by weight |
| 50% KOH | 39.50 |
| EDTA | 22.77 |
| Diacid 1550 (C$_{18}$ fatty acid) | 13.20 |

Simultaneously with the beginning of the addition of the premix, microprocessor 63 (FIG. 3) started recirculating pump 55, which was run continuously until addition of substantially all of the premix was completed (2-3 minutes). Then microprocessor 63 (FIG. 3) stopped recirculating pump 55, and the system was reweighed by loal cell 59. Based on the weight obtained, any additional small quantity of the premix needed was added to bring the weight of premix to 21.6 lbs. Then recirculating pump 55 was started, and 11 lbs. of 50% liquid KOH was added from tank 46 by pump 49 through line 52 and entry port 43 by means of microprocessor 63 (FIG. 3) and load cell 59. After substantial completion of the KOH addition, recirculating pump 55 was stopped, the system was reweighed with load cell 59, and an additional increment of KOH added as needed. Then recirculating pump 55 was started, and 30.5 lbs. of tall oil was added to conduit 41 from tank 45 by pump 48 through line 51 and entry port 42. After substantial completion of the tall oil addition, recirculating pump 55 was stopped, the system reweighed with load cell 59, and an additional increment of tall oil added as needed. During the addition of the tall oil, the temperature rose an additional 30°-40° F. Following the addition of the tall oil recirculating pump 55 was run for an additional 30 seconds. Then recirculating pump 55 was stopped, recirculating valve 56 was closed, transfer valve 57 was opened, recirculating pump 55 started, and the reaction mixture pumped into storage tank 58. The total elapsed time for the above process was 6-8 minutes. 200 lbs. of an aqueous soap mixture was obtained. The yield of soap was 100%, based on the reactants.

I claim:

1. Apparatus for carrying out mixing or chemical reactions in the liquid state comprising:
   (a) a reactor or mixing vessel having sidewalls and a cone-shaped bottom section;
   (b) a conduit extending vertically through said vessel, wherein said conduit is provided with a first set of openings and a second set of openings therein, said first set of openings being positioned near said bottom section of said vessel, and said second set of openings being positioned above said first set of openings, said first set of openings and said second set of openings having means positioned therebetween to direct a flow of liquid exiting said conduit toward said sidewalls of said vessel;
   (c) a recirculating system connected to said vessel, said recirculating system having outlet means and inlet means adapted to mix and recirculate the liquid contents of said vessel out of said vessel through a recirculating valve and back into said vessel;
   (d) supply means for introducing liquid materials into said vessel; and
   (e) means for diverting the liquid contents of said recirculating system out of said recirculating system.

2. Apparatus according to claim 1 wherein said vessel has a capacity of from about 1 to about 25 gallons.

3. Apparatus according to claim 1 wherein said means to direct a flow of liquid exiting said conduit comprises a baffle plate.

4. Apparatus according to claim 1 wherein said recirculating system is connected to a pump.

5. Apparatus according to claim 1 wherein said vessel has a substantially cylindrical upper section.

6. Apparatus according to claim 5 wherein said conduit is substantially parallel to the sidewalls of said cylindrical upper section of said vessel.

7. Apparatus according to claim 1 wherein the first and second sets of openings are positioned around said conduit.

8. Apparatus according to claim 7 wherein the first and second sets of openings are spaced substantially uniformly around said conduit.

9. Apparatus according to claim 8 wherein each of the first and second set of openings comprises two rows of uniformly spaced openings.

10. Apparatus according to claim 1 wherein said recirculating system recirculates through the upper section of the conduit.

11. Apparatus according to claim 10 wherein said supply means are positioned to introduce liquid materials into a section of the conduit that extends below said vessel.

12. Apparatus according to claim 11 wherein said apparatus is connected to a microprocessor control means.

13. Apparatus according to claim 12 wherein said vessel is connected to a load cell.

14. A process for carrying out mixing or chemical reactions in the liquid state comprising the steps of
   A. sequentially introducing chemical components into a conduit that extends vertically through a reactor or mixing vessel having sidewalls and a cone-shaped bottom section, said conduit being provided with a first set of openings and a second set of openings therein, said first set of openings being positioned near said bottom section of said vessel, and said second set of openings being positioned above said first set of openings, said first set of openings and said second set of openings having means positioned therebetween to direct a flow of liquid exiting said conduit toward said sidewalls of said vessel;
   B. continuously recirculating the contents of said vessel through a recirculating system connected to said vessel, said recirculating system having outlet means and inlet means adapted to mix and recirculate the liquid contents of said vessel out of said vessel through a recirculating valve and back into said vessel; and
   C. following the completion of all chemical reactions in the process, diverting the liquid contents of said recirculating system out of said recirculating system.

15. A process according to claim 14 including controlling the process by microprocessor means.

16. A process according to claim 14 wherein the process is a saponification process for making soap.

17. A process according to claim 16 wherein the total reaction time is from about 2 to about 8 minutes, at a reaction temperature of from about 70° F. to about 200° F.

18. A process according to claim 16 wherein the raw material for saponification is one or more of tall oil, coconut oil, oleic acid, linoleic acid, saponifiable oils containing liquid oleic and linoleic acid, cracked oils, fatty acids, butyric acid, caproic acid, caprylic acid, nonanoic acid, lauric acid, myristic acid, palmitic acid, stearic acid, and elaidic acid; and an alkali is employed which is one or more of NaOH, KOH, monoethanolamine, diethanolamine, and triethanolamine.

19. A process according to claim 14 wherein the quantities of chemical components are determined by means including a load cell.

20. A process according to claim 19 wherein the chemical components are introduced into the conduit using timed volume feed means.

* * * * *